April 17, 1951  J. P. BISHOP  2,549,161
CAKE MOISTENER
Filed Feb. 9, 1950
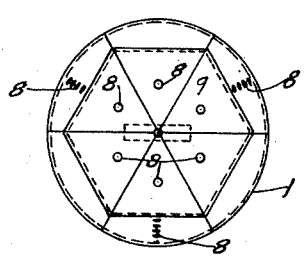
Fig. 2.
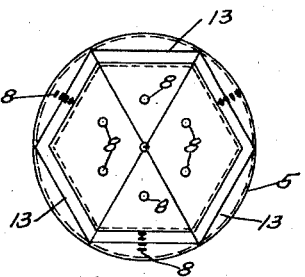
Fig. 3.
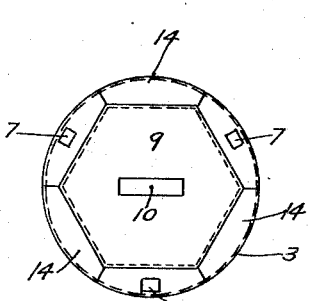
Fig. 5.
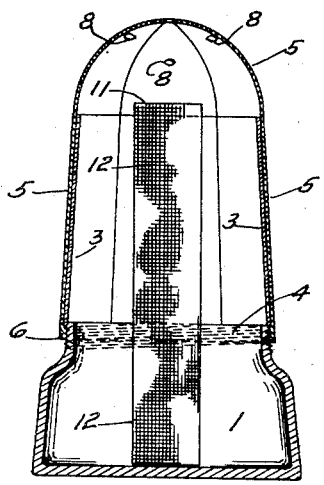
Fig. 1.
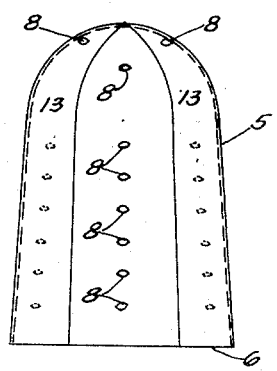
Fig. 4.
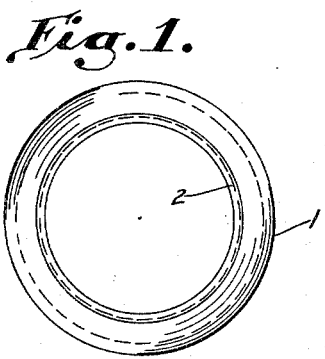
Fig. 6.
Fig. 7.
Fig. 8.
Inventor
John P. Bishop
By Chas. Denegre
Attorney Patented Apr. 17, 1951

2,549,161

UNITED STATES PATENT OFFICE 2,549,161

CAKE MOISTENER

John P. Bishop, Birmingham, Ala.

Application February 9, 1950, Serial No. 143,330

4 Claims. (Cl. 299—20)

This invention relates to a cake moistener. It has for its main objects to provide such a device that will be highly efficient for its purpose, simple in structure, cheap to manufacture, easy to use, extremely durable, and attractive in appearance. As is well known, a cake as food in a home is often allowed to continue for some time, and as a result becomes dry in its container. With the present device a cake can be maintained in a fresh and soft condition for quite a long time.

While the device is especially intended for use with cakes, it may also be used for bread, or in any other place where a moist condition is required or desired.

Other objects and advantages will appear from the drawing and description.

By referring generally to the drawing, part of this application, it will be observed that Fig. 1 is a vertical substantially center sectional view of the assembled moistener; Fig. 2 is a top plan view of the assembled moistener; Fig. 3 is a top view of Fig. 4; Fig. 4 is a side view of the cover member; Fig. 5 is a top view of Fig. 6; Fig. 6 is a side view of the middle member; Fig. 7 is a top view of Fig. 8; and Fig. 8 is a side view of Fig. 7 showing the base of the assembly.

Similar reference numerals refer to similar parts throughout the several views.

Referring to the drawings in detail it will be seen that the moistener comprises a main base 1 adapted to contain water, having screw threads 2 around its upper edge, a middle member 3 with threads 4 in its lower edge for screwing upon the base member. A cover member 5 is mounted upon the middle member 3 with its lower edge 6 adjacent the top edge of the base. The middle member is made with its upper outer portion above the threads hexagon in shape with slots 7 in three panels. The cover member 5 is also hexagon in shape above its bottom edge with holes 8 in three of its panels and top. The member 3 has a top flat panel 9 with a slot 10 therein of a size to hold slightly clamped the top end 11 of a fabric wick 12 depending therefrom down into the base 1 with water therein.

From the foregoing it will appear that in condition for use the middle member 3 is screwed upon the base member 1 with the wick 12 held by its top end 11 in the slot 10 of the flat panel 9 of the middle member 3 with the wick lower end in water in the base. The inner space of the cover member 5 is sufficiently large for it to fit over the outer face of the middle member 3, and also it is adapted to fit with its blank panels 13 over the slots 7 in the middle member 3, or have its panels with holes 8 therein register with the slots 7 in the panels 14 of the middle member 3. This arrangement provides for control of the amount of moisture diffused from the wet wick.

The various parts of the device may be made of any material suitable for the purpose, but I prefer to use plastic, aluminum, glass, or stainless steel, and the regular type or grade of cotton or fabric wick as used in oil burning lamps. Also the moistener may be made in various sizes and capacities, depending on where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A moistener of the class described comprising, a round open top base member adapted for holding water, screw threads around the upper edge of the said base member, a second member having a round bottom edge portion with screw threads therein with the upper portion having a surrounding wall hexagon in shape, a flat panel integral with the top edge of the wall, said panel having an oblong slot in the middle portion thereof, said wall having an oblong slot in each of three of its hexagon panels with a blank panel between any two of said panels with slots, said second member screwed upon the said first member, a fabric wick mounted with its upper end held in said slot in the top panel of the second member with the bottom end of the wick extended into the base member; a third member substantially cup-shaped with its mouth portion being round and its remaining portion being hexagon in shape and having a plurality of vent-holes in each of three of its panels with a blank panel between any two of said panels with vent-holes therein.

2. A moistener of the class described according to claim 1, and being further characterized by said cup-shaped member being of a size to fit over said second member with its round mouth portion in close propinquity to the top edge of the base member.

3. A moistener of the class described according to claim 1, and being further characterized by said cup-shaped member being of a size to fit over said second member with the vent-holes in the cup-shaped member in register with the slots in the panels of the said second member.

4. A moistener of the class described according to claim 1, and being further characterized by said cup-shaped member being of a size to fit over said second member with the vent-holes in the cup-shaped member adjacent the blank panels of the said second member.

JOHN P. BISHOP.

REFERENCES CITED

The following references are of record in the file of this patent:

UNITED STATES PATENTS

| Number | Name | Date |
|---|---|---|
| 739,297 | Dayton | Sept. 22, 1903 |
| 1,984,055 | Carter | Dec. 11, 1934 |
| 2,412,326 | Dupuy | Dec. 10, 1946 |